United States Patent [19]
Richter et al.

[11] Patent Number: 5,466,413
[45] Date of Patent: Nov. 14, 1995

[54] METHOD AND APPARATUS FOR BLOW MOLDING A PLASTIC DRINKING VESSEL

[75] Inventors: Simon J. Richter, Marietta, Ga.; Frank G. Hohmann, Tenafly; Ernst Vesely, Sussex, both of N.J.

[73] Assignee: The Coca-Cola Company, Atlanta, Ga.

[21] Appl. No.: 111,923

[22] Filed: Aug. 26, 1993

[51] Int. Cl.⁶ .......................... B29C 49/50; B29C 49/64
[52] U.S. Cl. .......................... 264/521; 264/533; 264/534; 264/536; 425/525; 425/526; 425/527
[58] Field of Search .......................... 264/536, 533, 264/534, 531, 521; 425/527, 525, 526, 292

[56] References Cited

U.S. PATENT DOCUMENTS

| | | | |
|---|---|---|---|
| 3,004,285 | 10/1961 | Hagen | 264/536 |
| 4,095,927 | 6/1978 | Roberg et al. | 425/527 |
| 4,445,406 | 5/1984 | Thatcher | 264/536 |
| 5,209,891 | 5/1993 | Guarriello et al. | 264/534 |
| 5,213,753 | 5/1993 | Przytulla | 264/534 |

FOREIGN PATENT DOCUMENTS

| | | | |
|---|---|---|---|
| 757782 | 4/1971 | Belgium | 425/527 |
| 648684 | 11/1962 | Italy | 264/536 |
| 588128 | 1/1978 | U.S.S.R. | 425/527 |

Primary Examiner—Catherine Timm

[57] ABSTRACT

A substantially cylindrical plastic parison is expanded within a blow mold against the internal walls thereof to form a plastic drinking vessel with a rim having substantially smooth inner and outer surfaces thereon. The inner surface is formed by a reciprocating cutter head assembly including an annular cutter blade with an outside diameter slightly less than the inside diameter of wall surfaces of the blow mold adjacent to a peripheral recess in the blow mold in which an external bead on the rim is formed. The cutter blade and cutter head assembly form a dome-shaped top in response to expansion of the parison. When the cutter blade is retracted axially from the blow mold the dome-shaped top is severed from the vessel. In an alternative embodiment the vessel and a partially severed dome-shaped top are removed as an integral unit from the blow mold and the dome-shaped top is then completely severed from the vessel utilizing a rotary cutter blade.

4 Claims, 4 Drawing Sheets

UP/SEVERING POSITION

UP/BLOW POSITION

DOWN/FORMING POSITION

UP/SEVERING POSITION

METHOD AND APPARATUS FOR BLOW MOLDING A PLASTIC DRINKING VESSEL

BACKGROUND OF THE INVENTION

The present invention relates to a method and apparatus for blow molding plastic drinking vessels including the formation of a bead around the rim thereof with smooth finishes on both the interior and exterior surfaces thereof. More specifically, the present invention relates to a method and apparatus for blow molding a plastic drinking glass and forming a bead around the rim thereof having a sufficient projection on the exterior surface to accommodate and retain a snap-on plastic lid for sealing the drinking glass.

A need in the art exists for a plastic drinking glass with a suitable bead structure around the rim thereof which permits the drinking glass to be sealed such as by a snap-on plastic lid and sold as a carry-out beverage package in a fast food type restaurant. It would be particularly advantageous to provide such a package for use in drive-through serving sections of fast food restaurants.

Clearly, it is desirable to package beverages in the most attractive of packages and of course it is generally accepted that real glass drinking vessels are considered to be the most attractive and aesthetically pleasing for the consumer. However, real glass is heavy, expensive, and fragile and, therefore, impractical for use as a carry-out beverage package. Plastic, on the other hand, can be made to look as good or better than glass and it is safer, lighter, and cheaper than glass. In addition, it has the ability to be inexpensively recycled, which has both economical and environmental advantages.

However, in order to be practical for use as a carry-out beverage package, a plastic glass needs to be capable of possessing all of the functional attributes of a paper cup such as the provision of a bead around the rim which will accommodate a snap-on plastic lid for sealing of the vessel.

Because a plastic glass can be made of transparent materials, such as polycarbonate or PETG, it can be made to simulate the appearance of a transparent, real glass. It can also be provided with attractive graphics and used for product promotions. However, if used in this manner it is still desirable to keep the production costs to a minimum to ensure a cost effective promotion.

Heretofore, plastic promotional cups or vessels have primarily been injection molded which is often functionally limiting process.

Ideally, a plastic drinking glass should be blow molded for cost savings. However, the resulting plastic drinking glass formed from a blow molding process must have a smooth inner rim area for comfort of the consumer's lips while drinking therefrom. It must also have a smooth outer surface for the rim or bead which has a large enough projection to accommodate a snap-on plastic lid as stated hereinbefore.

Traditionally, blow molding of containers such as jars which have an external bead which is formed by the recess in the blow mold do not have a smooth inner surface around the rim because the cutting process for severing the molded article from its parison tends to leave a rather rough, sharp inner surface area around the rim. Of course if the container is to be used as a jar such as for storage of various contents, and it is not to be used as a drinking vessel, it is acceptable to leave a fairly rough inner finish around the interior of the rim.

However, a need in the art exists for a blow molding process and apparatus which can provide a smooth inner surface for the rim, making the blow molded container suitable for use as a drinking vessel having the appearance of transparent glass.

However, for cost savings, it would be desirable that the entire process which forms the smooth inner surface around the rim of the vessel, takes place within the blow mold so that no external secondary processing is required to achieve the smooth inner surface or bead.

In the alternative, if any external secondary processing is needed in order to achieve this smooth inner surface, it is desirable that it be as simple as possible to help keep additional processing costs at a minimum.

SUMMARY OF THE INVENTION

Accordingly, it is a primary object of the present invention to provide a method and apparatus for blow molding a plastic drinking vessel having a rim with a bead including a smooth finish on both the interior and exterior surfaces thereof.

It is a further object of the present invention to provide a method and apparatus for blow molding a plastic drinking vessel with a bead formed around the rim which will accommodate and retain a snap-on plastic lid for sealing of the drinking vessel.

It is yet another object of the present invention to provide a method and apparatus for blow molding a plastic drinking vessel with a smooth bead around the rim thereof wherein the entire process of forming the bead with the requisite smooth finishes can be performed within the blow mold without secondary external processing.

The objects of the present invention are fulfilled by providing a method for forming a plastic drinking vessel by blow molding, said drinking vessel including a rim with an external bead thereon the rim having internal and external surfaces, comprising the steps of:

forming a substantially cylindrical plastic parison;

introducing the parison into a blow mold having internal walls with a shape corresponding to that of the desired drinking vessel including a peripheral recess for forming the bead;

expanding the parison within the blow mold against said internal walls to form said vessel and the bead;

providing a cutter head assembly adjacent to the peripheral recess in said blow mold and axially spaced therefrom, said cutter head assembly including an annular cutter blade with an outside diameter slightly less than the inside diameter of wall surfaces of the blow mold adjacent to said peripheral recess, said cutter blade and cutter head assembly forming a dome-shaped top in response to expansion of the parison, said dome-shaped top having sidewalls connected at the external surface of the rim at said bead;

moving the cutter blade and cutter head assembly axially of the vessel into the blow mold in order to curl the sidewalls of the dome-shaped top inwardly into contact with the interior of the vessel rim at a region just below the peripheral recess in the walls of the blow mold;

controlling the temperature of the cutter blade at said region to thereby soften and secure the sidewalls of the dome-shaped top at said region; and retracting the cutter blade and cutter head assembly axially from the blow mold to thereby sever the dome-shaped top from the vessel;

whereby the curl formed from the dome-shaped sidewalls forms a smooth internal surface of the vessel rim.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DETAILED DESCRIPTION OF PREFERRED EMBODIMENTS

Figure 1:
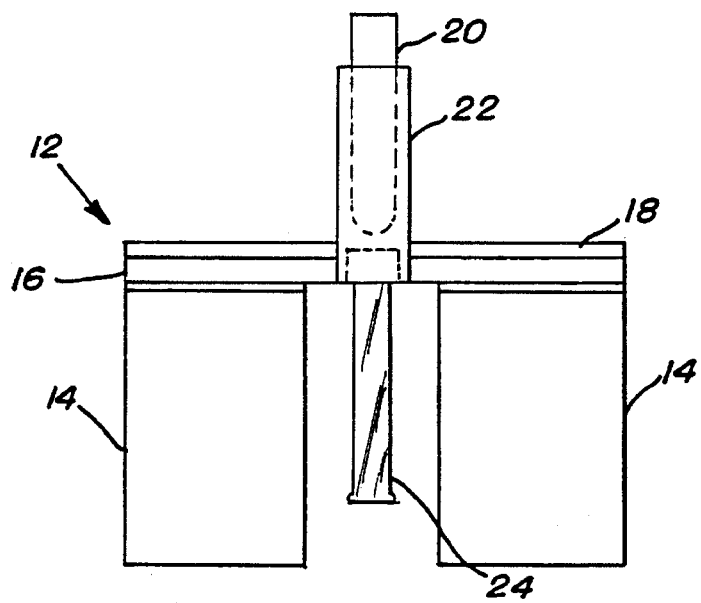
FIG. 1 is a side elevational view of a blow molding apparatus of the present invention illustrating the formation of a parison prior to insertion of the parison between the blow mold halves.
Figure 2:
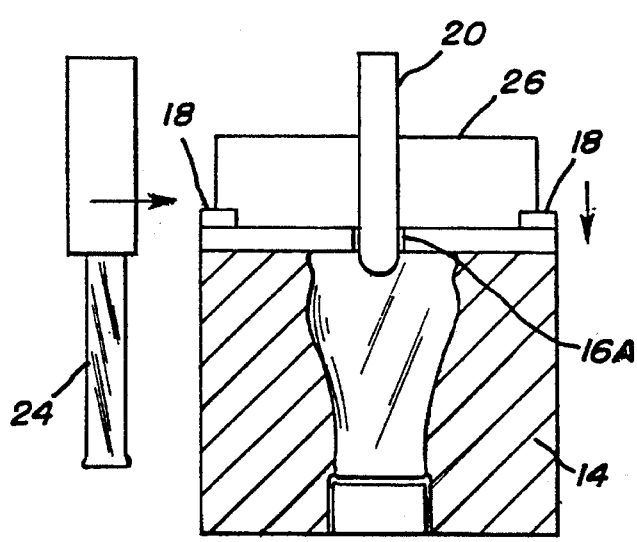
FIG. 2 is a front elevational view of the apparatus of FIG. 1 with the front blow mold half broken away for clarity illustrating the insertion of the parison in synchronism with insertion of the blow pin into the blow mold.

Referring in detail to FIGS. 1 and 2 there is illustrated a blow molding apparatus 12 including a pair of mold halves 14 and a dome-shaped top plate 16. Top plate 16 together with mold halves 14 form a telescoping mold. A substantially cylindrical plastic parison 24 is extruded from an extruder 22 and is then inserted between mold halves 14. A reciprocating blow pin 20 is provided for insertion axially through aperture 16A in plate 16, between mold halves 14 and into parison 24 from the motive force provided by a hydraulic ram or the like.

Figure 11:
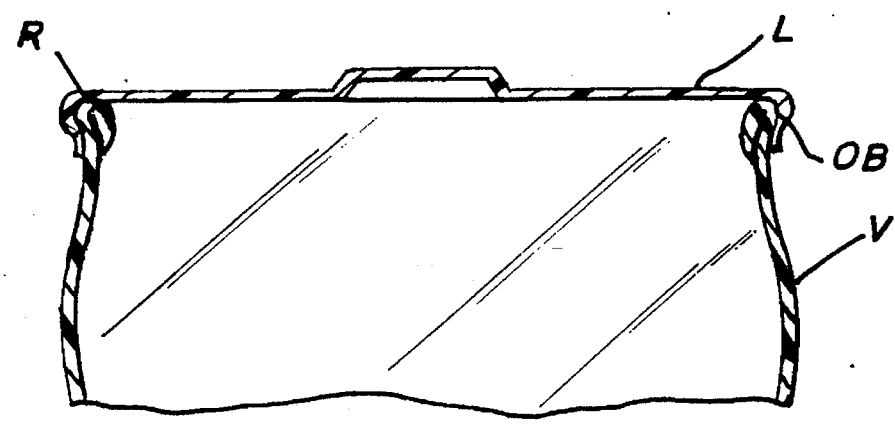
FIG. 11 is a cross-sectional view of a plastic glass made by the method of the present invention with a snap-on lid thereon.

In operation the parison 24 is formed by extruder 20 and is inserted laterally until it is disposed under the blow pin 20 between the mold halves. The blow pin 20 is then inserted axially through aperture 16A in plate 16 into the parison 24 applying air pressure to the interior thereof to expand the parison 24 against the inner sidewalls of mold halves 14. The mold halves 14 are provided with appropriately shaped inner surfaces to form a vessel or container of the desired shape. For example, a recess 50 is provided for forming the outer surface of a bead OB about the rim of the container for accommodating a snap-on sealable lid, such as illustrated in FIG. 11.

Top plate 16 of the mold has a dome-shaped cavity therein and is provided with a central aperture 16A for accommodating the passage of blow pin 20. Plate 16 forms a top wall of the mold and is utilized to form a removable dome-shaped top D for the vessel while the vessel is being shaped in the mold. As will become more readily apparent hereinafter with reference to FIGS. 6 and 7, plate 16 is spring-loaded for reciprocation between two spaced axial positions with respect to the axis of the blow mold. The space between these axial positions (the length of the stroke) is preferably about 0.20 inches.

Figure 3:
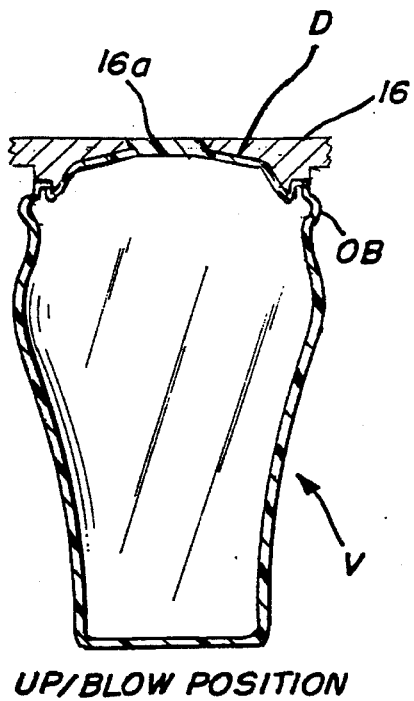
FIG. 3 is a cross-sectional view illustrating the shape of the vessel formed by the apparatus of FIGS. 1 and 2 and the method of the present invention in the blow position of the apparatus.
Figure 5:
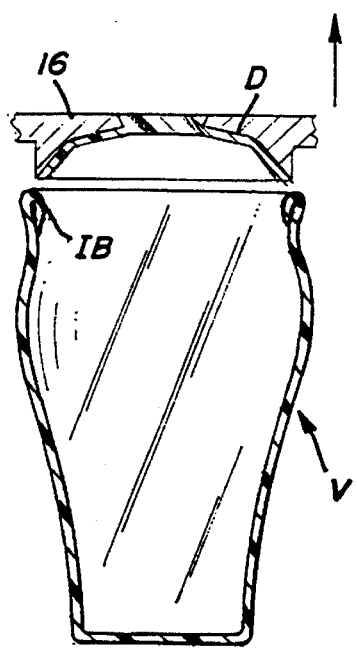
FIG. 5 illustrates the vessel of the present invention just after the dome-shaped top is severed from the vessel.
Figure 6:
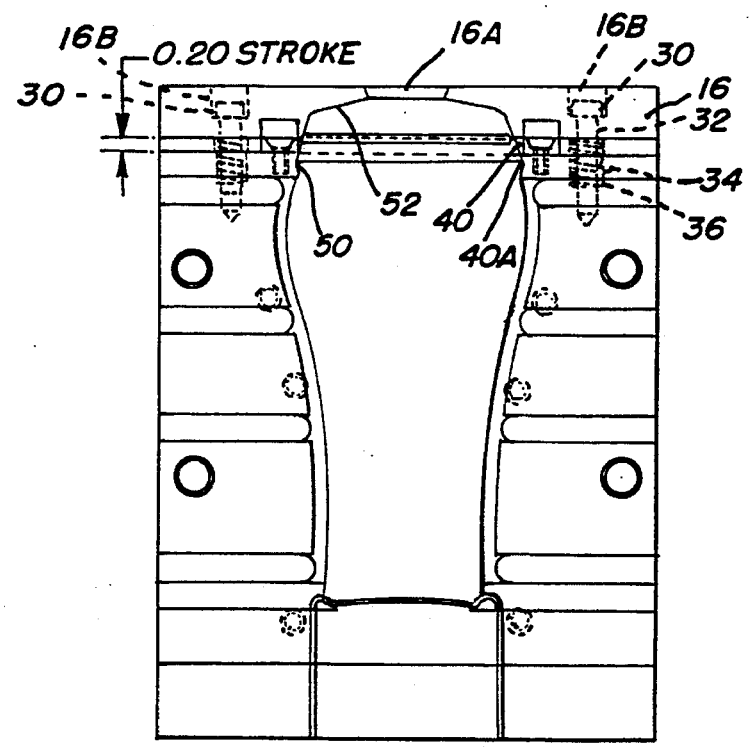
FIG. 6 is an elevational view of a blow mold half with the cutter blade of the dome-shaped top plate in the up blow position.

These positions are best illustrated by reference to FIGS. 3–5 in conjunction with FIGS. 6 and 7. As illustrated in FIGS. 3 and 6 the vessel V is formed between the blow mold halves 14 and top plate 16 including the provision of a dome-shaped top D and the formation of the outer bead OB about the rim of the vessel. In this position of FIG. 3 the blow pin is inserted as illustrated in FIG. 2 and the dome-shaped plate 16 is in the up position. (See FIG. 6) FIG. 3A is an enlarged view illustrating the interface of top D and the sidewalls of vessel V when plate 16 and cutter 40 are in the position indicated in FIG. 3.

Figure 3A:
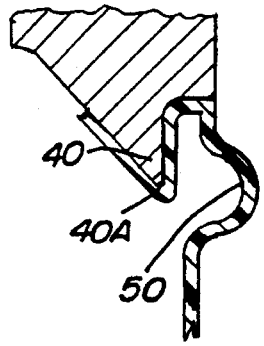
FIG. 3A is an enlarged view showing the position of the cutter blade in the up blow position of FIG. 3.
Figure 4A:
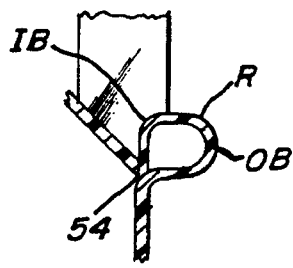
FIG. 4A is an illustration of the position of the cutting blade in the down forming position of FIG. 4, and the manner in which it forms a curl or re-entrant bend to facilitate the provision of a smooth inner bead surface.
Figure 4:
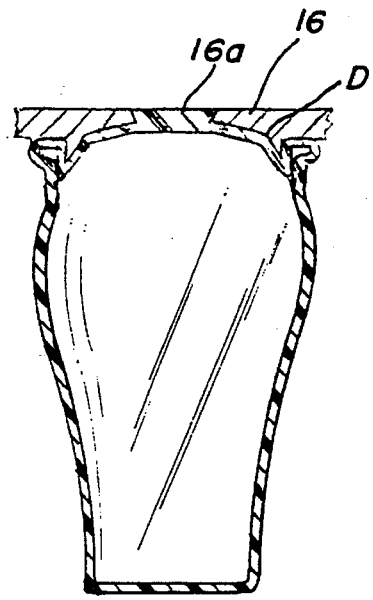
FIG. 4 illustrates the shape and condition of the vessel in the down or forming position of the interior surface of the rim bead.
Figure 7:
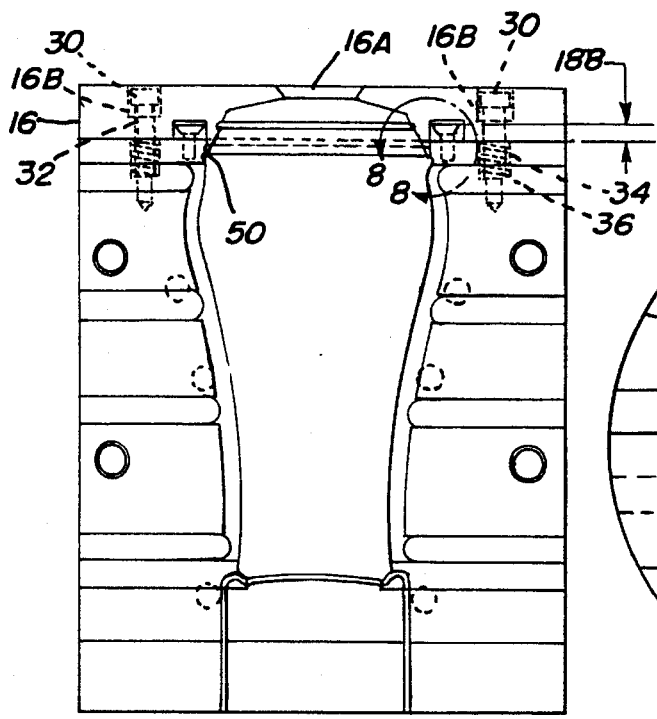
FIG. 7 is an elevational view of the blow mold half illustrating the dome-shaped top plate and cutter blade in a down forming position.

In the next position illustrated in FIGS. 4 and 7 the dome-shaped plate 16 is forced downwardly axially of the blow pin and the sidewalls of the dome-shaped top D are curled inwardly forming a re-entrant bend R resulting in the formation of an inner surface IB secured to the inner sidewalls of the vessel V at 54 (See FIGS. 3A and 4A). The thickness of the molded material at 54 is very thin and the material is in a molten state due to the temperature of cutter 40 and associated tip 40A. It should be noted that FIG. 4A is an enlarged view illustrating the position of cutter 40 in FIG. 4 and the shape of the interface between top D and the sidewalls of vessel V.

Accordingly, when the dome-shaped plate 16 is retracted to an up position (FIG. 5), the dome-shaped top D is severed at 54 from the formed inner surface IB and the dome-shaped top D is severed and separated from the remaining portions of the vessel.

In a preferred embodiment the temperature range of the mold is maintained at from about 40° C.–80° C. which results in a temperature at the tip 40A of knife 40 of about 70° C.–90° C. Since it is desirable that the dome-shaped top D becomes solidified before being retracted and severed from the remainder of the vessel, appropriate thermal insulation is provided between the knife or cutter portion 40 and the top of the dome-shaped plate 16 in order to maintain the temperature of the top of the dome-shaped plate at about 158° C.–195° F. Appropriate cooling channels are provided in the top of the dome-shaped plate 16 to cool the same to within this temperature range.

Further details of the dome-shaped plate 16 which forms the top wall of the mold, the blow mold halves and the positions of the cutter blade 40 and dome-shaped top plate are illustrated in FIGS. 6 to 9. For example, FIG. 6 illustrates the dome-shaped plate 16 and the up blow position. Plate 16 is provided with return springs 34 disposed in counterforce 36. Only two springs are shown in FIG. 6 but four are symmetrically disposed near the four corners of the plate 16. Springs 34 are concentrically disposed about shafts 32 of shoulder bolts 30 which are mounted for reciprocating movement within recesses 16B in the top of plate 16. Therefore, plate 16 is normally biased to the up position as illustrated in FIG. 6 by return springs 34 but may be compressed to the down or forming position of FIG. 7 by the application of a motive force through frame 26 and outriggers 18 coupled to the top edges of plate 16. Upon release of the force applied to frame 26 and outriggers 18, the return springs 34 will retract the dome-shaped plate 16 to the up position automatically causing the severing of the dome-shaped top D from the remainder of the blow-molded vessel (FIG. 5). In the alternative the return force could be provided by hydraulic or pneumatic power instead of by return springs.

Figure 8:
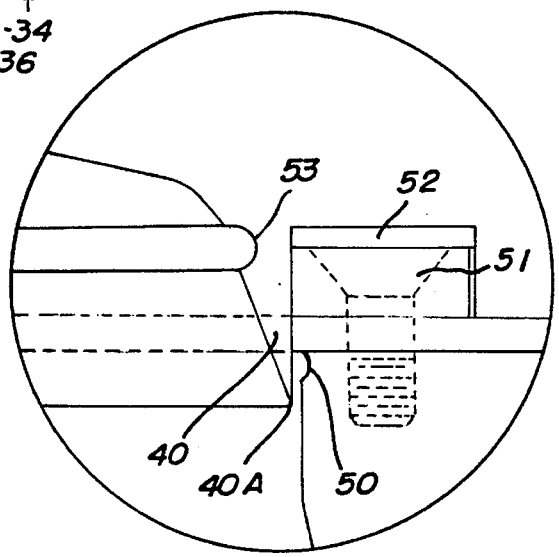
FIG. 8 is an enlarged view of the cutter blade assembly of FIG. 7 in the down forming position.
Figure 9:
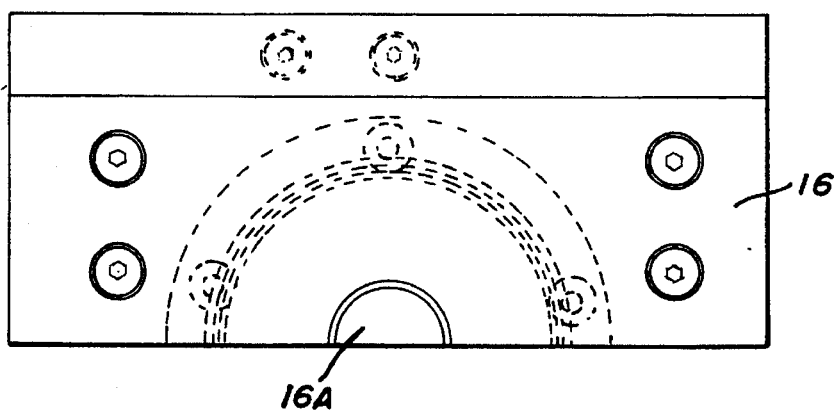
FIG. 9 is a top plan view of one of two halves of the dome-shaped top plate of the blow mold assembly of the present invention.

FIG. 8 is an enlarged view of detail "A" of FIG. 7 showing blade or knife 40 in the down position. Blade tip 40A extends to just below bead forming recess 50 and is spaced by about 0.025 inches from the sidewalls of the mold. In the down position plate 16 rests on pads 52 supported by screws 51. A bead 53 is formed on top D with an appropriate recess in the mold in plate 16. Bead 53 helps retain the dome-shaped part after the knife edge 40A has cut it loose from the rim R. It should be noted that the cutter or knife 40 in FIGS. 3A, 4A has a peripheral step or recess therein. In the FIG. 8 embodiment this step has been removed. It has been found that removing this step results in even more reliable severing at 54 of the dome D from the sidewalls of the vessel when plate 16 and cutter 40 are retracted.

Figure 10:
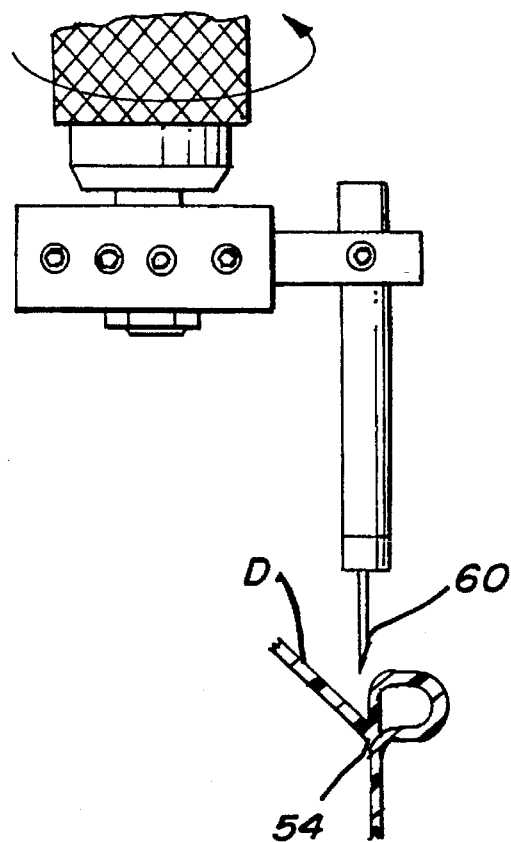
FIG. 10 is an illustration of an alternative embodiment of the present invention wherein the dome-shaped top may be severed from the walls of the molded vessel utilizing a rotary cutter knife.

It is preferred that the severing of the dome-shaped top occur within the blow mold in the manner described above so that no external secondary processing is required to sever the dome-shaped top from the remainder of the vessel. However, in an alternative embodiment illustrated in FIG. 10, the formed vessel is removed from the blow mold with the dome-shaped top at least partially intact and the vessel is supported in alignment with a rotary cutter knife 60 which engages the weakened, thin area 54 and severs the dome-shaped top D from the remainder of the vessel. This cutting operation is simplified by the fact that the material at 54 has been weakened by the formation process of the present invention described hereinbefore.

The resulting vessel or container may be sealed with a snap-on lid L illustrated in FIG. 11 which snaps over and under the outer bead OB of rim R providing a finished carry-out beverage package.

The container of the present invention is preferably blow molded from amorphous PET such as EPET. In the alternative the container may be blow molded from a polycarbonate material.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for forming a plastic drinking vessel by blow molding, said drinking vessel including a rim with a bead thereon the rim having internal and external surfaces, comprising the steps of:

forming a substantially cylindrical plastic parison;

introducing the parison into a blow mold having internal walls with a shape corresponding to that of the desired drinking vessel including a peripheral recess for forming the bead;

expanding the parison within the blow mold against said internal walls to form said vessel and the bead;

providing a cutter head assembly adjacent the peripheral recess in said blow mold and axially spaced therefrom, said cutter head assembly including an annular cutter blade with an outside diameter slightly less than the inside diameter of wall surfaces of the blow mold adjacent to said peripheral recess, said cutter blade and cutter head assembly forming a dome-shaped top in response to expansion of the parison, said dome-shaped top having sidewalls connected at the external surface of the rim at said bead;

moving the cutter blade and cutter head assembly axially of the vessel into the blow mold in order to curl the sidewalls of the dome-shaped top inwardly into contact with the interior of the vessel rim at a region just below the peripheral recess in the walls of the blow mold;

controlling the temperature of the cutter blade at said region to thereby soften and secure the sidewalls of the dome-shaped top at said region; and retracting the cutter blade and cutter head assembly axially from the blow mold to thereby sever the dome-shaped top from the vessel;

whereby the curl formed from the dome-shaped sidewalls forms a smooth internal surface of the vessel rim.

2. The method of claim 1 wherein the cutter blade at said points is maintained at a temperature in a range from about 70° C. to 90° C. and the cutter head assembly includes a top wall thermally insulated from said cutter blade, the method including the further steps of cooling said top wall to a temperature in a range from about 158° F. to 195° F. and heating the internal walls of the blow mold to temperatures in a range from 40° C. to 80° C.

3. A method for forming a plastic drinking vessel by blow molding, said drinking vessel including a rim with a bead thereon, the rim having internal and external surfaces, comprising the steps of:

forming a substantially cylindrical plastic parison;

introducing the parison into a blow mold having internal walls with a shape corresponding to that of the desired drinking vessel including a peripheral recess for forming the bead;

expanding the parison within the blow mold against said internal walls to form said vessel and the bead;

providing a cutter head assembly adjacent the peripheral recess in said blow mold and axially spaced therefrom, said cutter head assembly including an annular cutter blade with an outside diameter slightly less than the inside diameter of wall surfaces of the blow mold adjacent to said peripheral recess, said cutter blade and cutter head assembly forming a dome-shaped top in response to expansion of the parison, said dome-shaped top having sidewalls connected at the external surface of the rim of said bead;

moving the cutter blade and cutter head assembly axially of the vessel into the blow mold in order to curl the sidewalls of the dome-shaped top inwardly into contact with the interior of the vessel rim at a region just below the peripheral recess in the walls of the blow mold;

controlling the temperature of the cutter blade at said region to thereby soften and secure the sidewalls of the dome-shaped top at said region;

retracting the cutter blade and cutter head assembly axially from the blow mold to thereby at least partially sever the dome-shaped top from the vessel;

removing the vessel and dome-shaped top from the blow mold; and cutting the sidewalls of the dome-shaped top at said region to completely sever the dome-shaped top from the vessel;

whereby the curl formed from the dome-shaped sidewalls forms a smooth internal surface of the vessel rim.

4. The method of claim 3 wherein the cutter blade at said points is maintained at a temperature in a range from about 70° C. to 90° C. and the cutter head assembly includes a top wall thermally insulated from said cutter blade, the method including the further steps of cooling said top wall to a temperature in a range from about 158° F. to 195° F. and heating the internal walls of the blow mold to temperatures in a range from 40° C. to 80° C.

* * * * *